(12) United States Patent
Ben-David et al.

(10) Patent No.: US 11,839,330 B2
(45) Date of Patent: Dec. 12, 2023

(54) AIR FRYER WITH ROTATING POT FOR ROBOTIC AND AUTOMATING FOOD PREPARATION SYSTEMS

(71) Applicant: Kitchen Robotics Ltd, Modiin (IL)

(72) Inventors: David Ben-David, Rehovot (IL); Yair Gordin, Modiin (IL)

(*) Notice: Subject to any disclaimer, the term of this patent is extended or adjusted under 35 U.S.C. 154(b) by 418 days.

(21) Appl. No.: 17/151,229

(22) Filed: Jan. 18, 2021

(65) Prior Publication Data

US 2022/0225826 A1 Jul. 21, 2022

(51) Int. Cl.
| | |
|---|---|
| A47J 37/06 | (2006.01) |
| A47J 36/16 | (2006.01) |
| A47J 36/34 | (2006.01) |
| A47J 36/32 | (2006.01) |

(52) U.S. Cl.
CPC ......... *A47J 37/0641* (2013.01); *A47J 36/165* (2013.01); *A47J 36/32* (2013.01); *A47J 36/34* (2013.01)

(58) Field of Classification Search
CPC ... A47J 37/047; A47J 37/0641; F24C 15/322; F24C 15/325
USPC .......................................................... D7/359
See application file for complete search history.

(56) References Cited

U.S. PATENT DOCUMENTS

| | | | | |
|---|---|---|---|---|
| 4,817,509 A | * | 4/1989 | Erickson | A47J 37/0641 219/400 |
| 5,165,328 A | * | 11/1992 | Erickson | A47J 37/0641 219/400 |
| 10,064,521 B1 | | 9/2018 | Gawali et al. | |
| D876,876 S | * | 3/2020 | Wang | D7/359 |
| 2005/0183716 A1 | * | 8/2005 | Oosterling | A47J 37/0641 126/369 |
| 2012/0114822 A1 | * | 5/2012 | Iversen | A47J 37/045 426/523 |
| 2014/0170275 A1 | | 6/2014 | Bordin | |
| 2017/0251874 A1 | * | 9/2017 | Sladecek | F24C 15/16 |
| 2018/0035698 A1 | | 2/2018 | McNerney | |

FOREIGN PATENT DOCUMENTS

| | | | | |
|---|---|---|---|---|
| DE | 20214744 U1 | * | 3/2004 | A23L 1/0135 |
| JP | 2019022461 A | * | 2/2019 | |
| WO | WO03029959 | | 4/2003 | |

* cited by examiner

*Primary Examiner* — John J Norton
(74) *Attorney, Agent, or Firm* — Haim M. Factor—1st-Tech-Ideas.com

(57) ABSTRACT

The present invention is to provide a cooking apparatus to operate in an automated/robotic environment containing 2 major sub-units: air fryer hood and a rotating pot wherein the air fryer hood streams high velocity, heated air, circulating it in the cooking pot which is rotated, generating a stirring motion of the food ingredients contained in the pot. The apparatus can be used as a stand alone or incorporated in robotic or automated food preparation systems. The apparatus provides controlled cooking regimes for various recipes and food product requirements and each of the sub-units of the apparatus is independently controlled, enabling turning on and off the sub-unit, adjusting the circulated air, velocity and temperature, adjusting the pot's rotational velocity and direction.

9 Claims, 6 Drawing Sheets

AIR FRYER WITH ROTATING POT FOR ROBOTIC AND AUTOMATING FOOD PREPARATION SYSTEMS

FIELD OF THE INVENTION

The present invention relates to cooking devices or cooking modules that can be used as stand-alone apparatus or else can be integrated in a robotic environment or in an automated food preparation system. More particularly, the said invention uses a high velocity air current combined with stirring motion generated by a rotating or a vibrating cooking pot, to rapidly cook food products.

BACKGROUND OF THE INVENTION

A wide variety of cooking devices as conventional ovens, induction cookers, microwaves, deep fryers are primarily in vogue for different types of meal preparation, the world over.

Conventional ovens despite being used for a long time for cooking food in restaurant and homes, faces numerous shortcomings. Amongst these, the primary ones being slow cooking time apart from consumption of a large volume of energy several attempts to solve this problem entailed incorporation of a circulating fan to generate air current inside the oven to enable optimal utilization of the fuel for generating maximum volume of heat energy to hasten up the cooking process. However, still then, the typical rectangular geometric shape entailed that the air flow cannot be maintained uniformly, thereby leading to a sub-optimal energy efficiency.

Again in microwave ovens, developed and introduced in an attempt to overcome the problem of conventional ovens, several inefficiency problems exist. Mostly in such ovens, browning of food does not occur, as is the basic criterion of deep fried food thereby, relegating the same superfluous in cooking fried items.

The introduction of deep fryers enabled faster and more efficient energy utilization besides deep frying, but the same failed to free food from the excess levels of fat thereby rendering the quality of a balanced food preparation on account of uneven cooking. The high velocity air circulation is disturbed by uneven food placed in the cylindrical cooking chamber, thus resulting in specific areas to be overcooked.

Despite the stated disadvantages, amongst the existing cooking means, air fryer technology is considered to be the most energy efficient and is increasingly utilized in restaurant, and kitchens, for cooking high quality, healthy meals.

In the last few years, emphasis on automation in cooking to enable faster and more energy efficient cooking besides minimal human interferences led to various automation techniques being adopted.

The published patent application US20180035698 titled, "Air Frying Systems and Methods" discusses an air frying system including a housing defining an inner chamber, a food container positioned in the inner chamber, an air heating and circulation system in communication with the food container, and a steam supply and circulation system in communication with the food container, wherein the air heating and circulation system and the steam supply and circulation system are independently controllable for cooking a food product in the food container.

In another published patent application U.S. Ser. No. 10/064,521 titled, "Automated multi-dish cooking machine" discusses an automated cooking mechanism that allows incorporation of an automated multi-dish cooking machine that is internet enabled and can be programmed to cook multiple dishes at any given time. The cooking machine can also store various recipes and food can be cooked in different portion sizes from different parts of the world at the same time. Based on the selected recipe, various items can be dispensed in measured quantities to the cooking vessel. The cooking machine also includes stirring assembly that can mix and stir food ingredients at programmed time intervals as per the details of selected recipe. This cooking machine can be operated from a remote location and may be programmed to start cooking different meals within each cooking vessels at different times since all the recipes do not call for same time for the entire cooking process.

Still another published patent application US20140170275A1 titled, "System For Automating Cooking Steps" discusses a cooking system for automating cooking steps of a recipe on a stove comprising a stove including a plurality of cooking elements; power controller for controlling the operation of each one of the cooking elements; and computer system in communication with the power controller, said computer system including a processor, computer readable data storage, and a visual display unit. The processor causes the computer system to perform the steps of: for each automated step of said recipe, generates a control signal for actuating at least one of the cooking elements and sends said control signal to the power controller; and for each manual or user step of said recipe, generates data representing user readable instructions for performing the user step and displays said data on the visual display unit. The power controller is adapted to actuate the cooking elements in accordance with each control signal received from the computer system.

Another invention WO2003029959A1 titled, "A method and a system of automatic cooking" relates to a kind of automatic cooking method and system. It transcribes the cooking action of the chef, and then the action is handled through figure or real time. By calculating the coordinates of the three special indicating points of the cooking wares—the pots and pancake turners used by the chef during he does it, the track of the pots and pancake turners can be reckoned out. According to the main materials and the seasoning volume and adding seasoning time and the track of the pots and pancake in the process of the chefs cooking, the cooking program is accordingly worked. Consequently, according to the signal instruction based on the above program, the mechanical arm in the mechanical operating device apes the cooking action of the chef to work out the food as the chef does it. Because through track record system the cooking action process can be recorded and programmed, and then the invention uses the relevant mechanical operating device to finish the cooking action of the chef, it can make that the restaurants or families easily eat the dishes made by the famous cookers only is they have the above program and mechanical operating device. This is not only conducive to popularizing the famous dishes, but also convenient to more people to enjoy them.

While the first mentioned application talks of an air frying technique, the use of the system in an automated environment is not the focus of the application. The other inventions despite focusing on automated cooking platform/machine does not incorporate air frying as an element of the system, taken the fact that such air frying system is considered the most optimal energy efficient technique available to-date in cooking.

To take care of the glaring lacuna incorporating air fryer technology in robotic and automated food preparation systems in essential. The present effort works in that direction by implementing air-frying technique in an automated and robotic environment.

SUMMARY OF THE INVENTION

An aspect of the present invention is to provide an air frying cooking apparatus for rapid, consistent and even meal or food product preparation, to be used stand alone or incorporated in robotic or automated food preparation systems.

A still further aspect of the invention is to provide a cooking apparatus containing 2 major sub-units: air fryer hood and a rotating pot wherein the air fryer hood streams high velocity, heated air, circulating it in the cooking pot which is rotated, generating a stirring motion of the food ingredients contained in the pot.

A still further aspect of the invention is to provide controlled cooking regimes for various recipes and food product requirements.

Another aspect of the present invention is that each of the sub-units of the apparatus is independently controlled, enabling turning on and off the sub-unit, adjusting the circulated air, velocity and temperature, adjusting the pot's rotational velocity and direction.

A further aspect of the invention is optimization of controlled parameters, for a specific recipe which includes but is not limited to, air temperature, air stream duration and frequency, pot rotational velocity and the pot's rotational direction resulting in reduction in the meal preparation duration, meal consistency and flavor.

A still further aspect of the invention is a heating element, positioned in the air fryer hood, which heats a high velocity air stream, generated by a fan which creates a vortex of air flow regime, forcing the air from the environment through the heating element, evenly distributing it within the cooking pot. The fan motor is equipped with an adjustable speed control, which regulates the air flow regime to suite the desired recipe.

A still further aspect of the invention is a pivoted air fryer hood. The air fryer hood, positioned above the rotating cooking pot, is pivoted, thus enabling its full disengagement and access to the cooking pot and the air fryer hood.

A still further aspect of the invention is providing a removable cooking pot which is enabled by the pivoted air fryer mechanism which provides a full access to manually or automatically place and remove the cooking pot from the apparatus. The cooking pot might include a gripping interface, such as but not limited to, a steel ring for gripping by electromagnets. Using various motion systems, such as but not limited to, driven linear guides, robotics arms, pneumatic actuators or electric actuators, the cooking pot can be gripped, removed from the apparatus and replaced by a clean cooking pot. Placing and removing the cooking pot from the apparatus is done by a single line of movement.

A further aspect of the invention is the rotation of the cooking pot for adequate air exchange. wherein, the rotational motion of the pot, stirs the cooking vessel or cooking pot contents continuously, thereby enabling the heated air stream to impact the entire food ingredients' surface more evenly.

Another aspect of the present invention is the presence of spring-loaded idler wheels which are flexible and increases the placement tolerance requirement thereby enabling both manual and automatic cookware mounting.

A further aspect of the present apparatus is the provision of the use of cookware of varying texture and surface finishes for cooking since the texture and the surface finish of the cookware have little effect on the tangential friction forces generated by the friction wheels since the spring-loaded idler wheels applies normal forces on the cookware's outer diameter which increases the range of cookware that can be used on the apparatus.

In an embodiment of the present invention, the apparatus can be operated stand alone as in prior art or it can also be operated as a subsystem of an automated food preparation apparatus. A series of independent cooking units can be operated and controlled by a processor, adjusting the rotational speed and direction, as well as the power, and other parameters individually. The inclined cooking angle can be individually adjusted as well, manually od automatically, to match the requirements for variety of recipes cooked.

A still further aspect of the invention is the cooking pot's rotational velocity and direction regulation. The rotational velocity of the cooking pot can be predefined or altered and controlled during the cooking process, depending on the recipe requirements.

A still further aspect of the invention is the rotation of the cookware which automates a hand steering motion for even heat dissemination. The rotational movement is generated by an electric motor, invoked by a controller and which receives commands from a processor.

A further aspect of the invention is equipping the cooking vessel or the cooking pot to vibrate during the cooking regime, thereby generating a relative motion of the food ingredients within the vessel or the pot, relative to its inner surface which thereby generates a stirring motion between the ingredients.

A further aspect of the invention is the generation and application of the vibration motion and the vibration forces on the removable cooking vessel or the removable cooking pot by an apparatus such as but not limited to, pneumatic drive or pneumatic element, AC or DC electrical motor or electrical rotational drive incorporating and eccentric element, electromagnetic actuator or electrical linear motor, solenoid valve.

In still another aspect of the invention, the cooking vessel or a cooking pot can, which may be removed or replaced or repositioned, and which is to be gripped to the vibration mechanism or a vibration element involves equipping the present apparatus with a mechanism such as but not limited to, a mechanical gripping clamp or a mechanical gripping mechanism, electromagnet, permanent magnet or a pneumatic suction element.

In a further aspect of the present invention the contact point of the gripping mechanism with the cooking vessel is insulated to temperatures ranging from 100° F. to 600° F.

Another aspect of the invention is an integral stirrer of the cooking pot for disturbing the food products within the cooking pot cavity. The pot's inner surface geometry includes a protrusion which acts as a stirrer during the rotational movement, thereby generating a stirring motion.

In some other aspects of the invention, the insulation is achieved by incorporating a layer of materials including-silicone, viton, ceramics and cork between the cooking vessel or the cooking pot heated surface and the gripping mechanism.

Another aspect of the present invention is the provision of setting a vibration profile which may be defined as the change in vibration motion characteristics, such as but not limited to, vibration motion frequency and vibration motion amplitude vs. the cooking or operating cycle duration or cooking time or system operating time.

A still further aspect of the invention is that the vibration motion amplitude and frequency might be preset and adjusted before or during the cooking cycle, turned on and off during the cooking cycle or altered during the cooking cycle.

In a further aspect of the invention, the vibration motion frequency and amplitude might be controlled, turned on and off, altered or adjusted depending on the cooking modes.

In another aspect of the present invention, the cooking apparatus provides for an adjustable cooking plane angle which can be inclined for cooking optimization, and controlling the stirring motion of the cooked food ingredients.

REFERENCE NUMERALS

Figure 1:
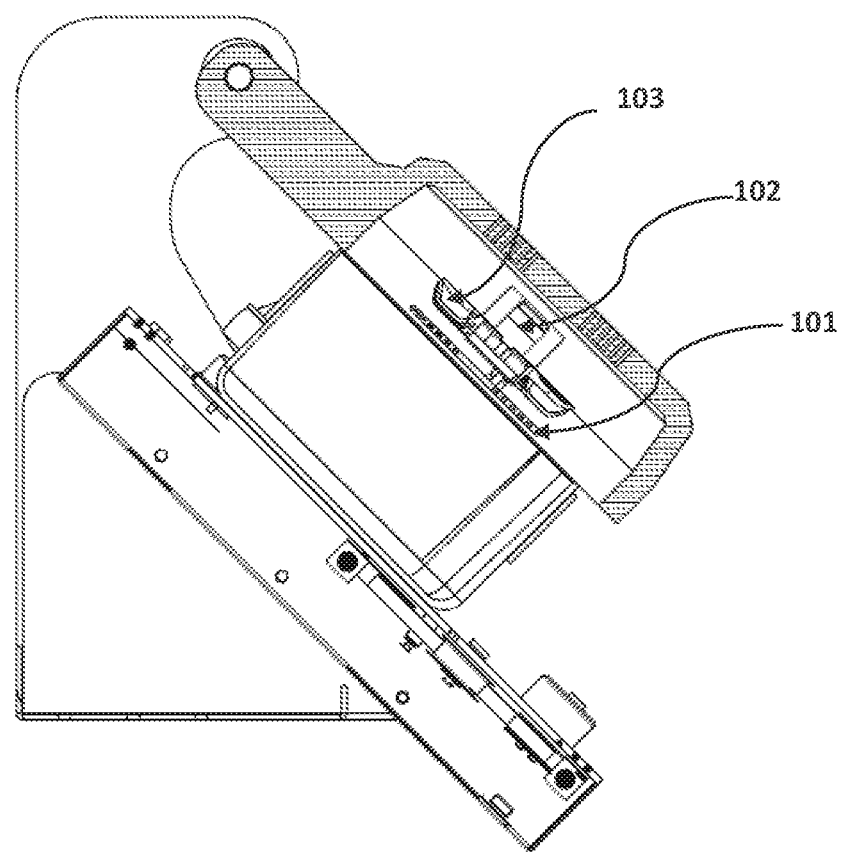
FIG. 1 is a cross section view of the apparatus of the present invention.
Figure 2:
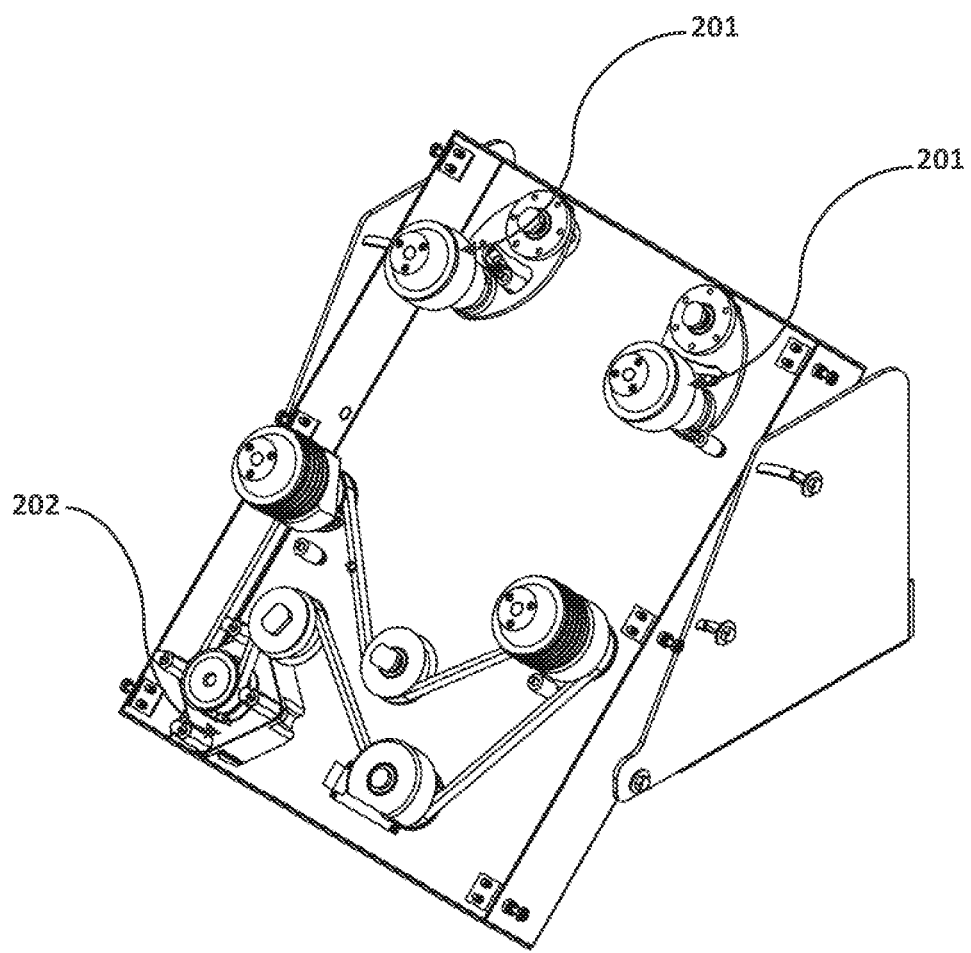
FIG. 2 is an isometric view of the rotational mechanism of the present invention.
Figure 3:
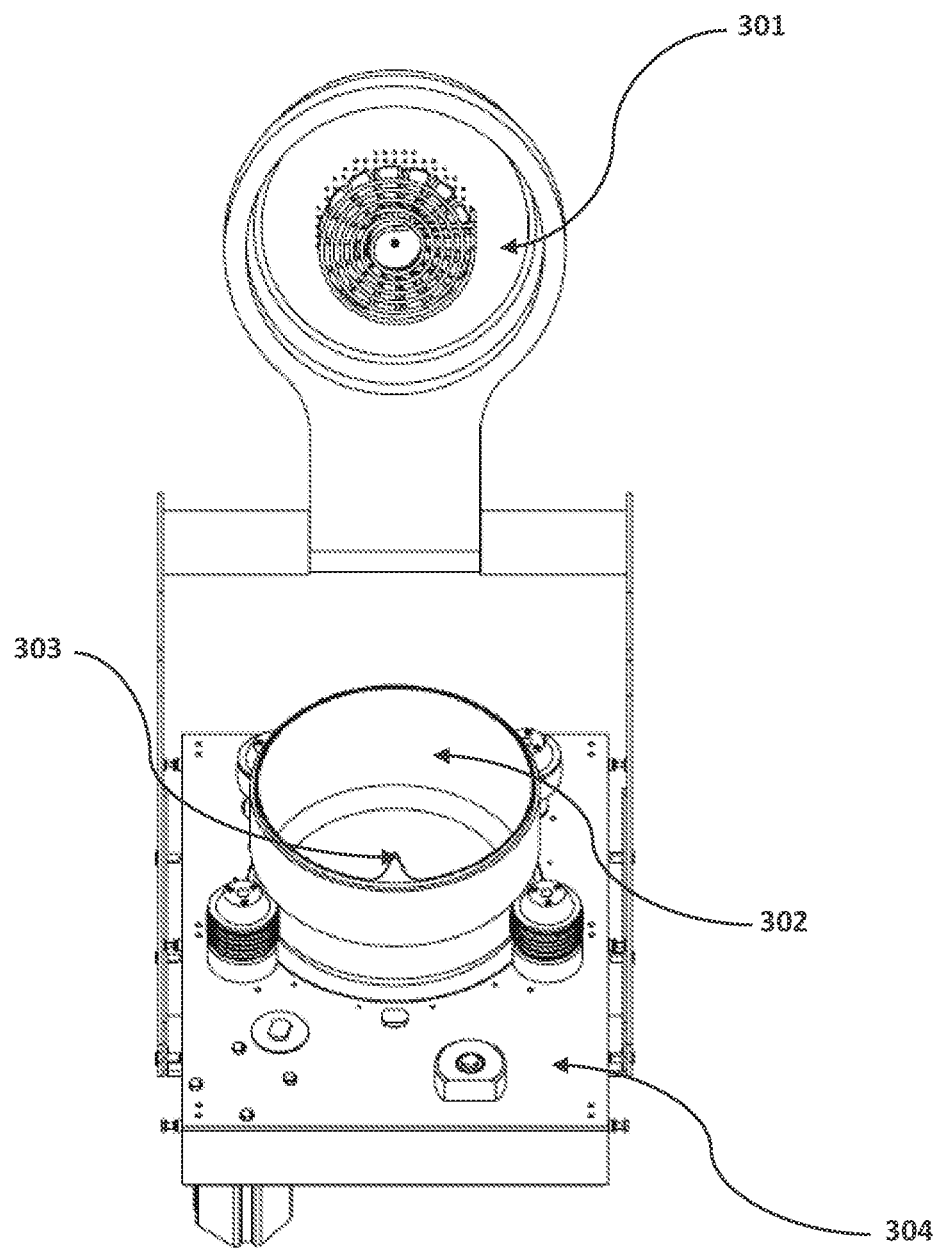
FIG. 3 is the Front view of the air fryer sub-unit disengaged of the present invention.

101 Air fryer heating element
102 Air fryer fan motor
103 Air fryer fan blade
201 Spring-loaded idler
202 Rotational mechanism driving motor
301 Air fryer hood sub-unit, disengaged
302 Cooking pot
303 Cooking pot stirring protrusion
304 Rotation pot mechanism
501 Cooking vessel or cooking pot gripping mechanism
502 Vibration mechanism
601 Cooking vessel or cooking pot gripping mechanism—side view

DETAILED DESCRIPTION OF THE PREFERRED EMBODIMENT

The present invention provides an air frying cooking apparatus for rapid, consistent and even meal or food product preparation, to be used stand alone or incorporated in robotic or automated food preparation systems.

Referring to FIGS. 1 to 4 the air frying apparatus of the present invention comprises 2 major sub-units.
  air fryer hood 301; and
  rotating or vibrating cooking pot 302
wherein the air fryer hood 301 streams high velocity, heated air, circulating it in the cooking pot 302 which is rotated, generating a stirring motion of the food ingredients contained in the pot 302.

The air fryer of the present invention comprises a heating element 101 positioned in the air fryer hood 301, which heats a high velocity air stream, generated by a fan 103 which is driven by a fan motor 102 which creates a vortex of air flow regime, forcing the air from the environment through the heating element 101, evenly distributing it within the cooking pot 302. The fan motor 102 is equipped with an adjustable speed control, which regulates the air flow regime to suite the desired recipe.

The heating element 101 is an open coil, resistance wire type, and is thermostatically regulated to maintain cooking temperatures ranging from 150 to 450 degrees F. The fan creates a vortex air flow regime, forcing the air from the environment through the heating element, evenly distributing it-within the cooking pot. Fan motor 102 is equipped with an adjustable speed control, regulating the air flow regime. The air velocity might exceed 1000 feet per minute, e.g., 2600 feet per minute to suite the desired recipe.

In an embodiment of the present invention the air fryer hood 301, positioned above the rotating cooking pot 302, is pivoted, which enables its full disengagement and access to the cooking pot 302 and the air fryer hood 301. The rotational motion around the pivot might be used as a switching mechanism, disabling or shutting down the apparatus or its sub-units, when disengaged or opened. The rotational engage/disengage motion might be generated by an electrical motor, pneumatic actuator or other motion elements, invoked by a controller and which receives commands from a processor.

In the apparatus of the present invention each of the sub-units of the apparatus is independently controlled, enabling turning on and off the sub-unit, adjusting the circulated air, velocity and temperature, adjusting the pot's rotational velocity and direction.

As mentioned earlier, the rotation of the cooking pot for adequate air exchange is another feature of the present invention. In applications, where the cooking vessel or a cooking pot is static, the high velocity heated air impacts the top surface of the food ingredients, thus resulting in uneven heat distribution. In the present invention, the rotational motion of the pot, stirs the cooking vessel or cooking pot contents continuously. Therefore, enabling the heated air stream to impact the entire food ingredients' surface more evenly and ensures even heating of the food ingredients in the cooking pot.

The cooking pot's rotational velocity and direction regulation is achieved by equipping the air fryer sub-unit with adjustable motor speed control, enabling velocity adjustment per recipe. The rotational velocity of the cooking pot can be predefined or altered and controlled during the cooking process, depending on the recipe requirements. The direction of the rotation can also be predefined or altered during the cooking process by changing the rotational velocity and direction enabled programming of a cooking regime, specific for a recipe. This is achieved by the controller of the apparatus which invokes the motor with the desired speed. The controller itself receives precise commands from the processor with regards to the rotational speed and direction to be maintained depending upon the type of cookware, the ingredients and the recipe to be cooked, the inputs of which is received by the processor.

Figure 4:
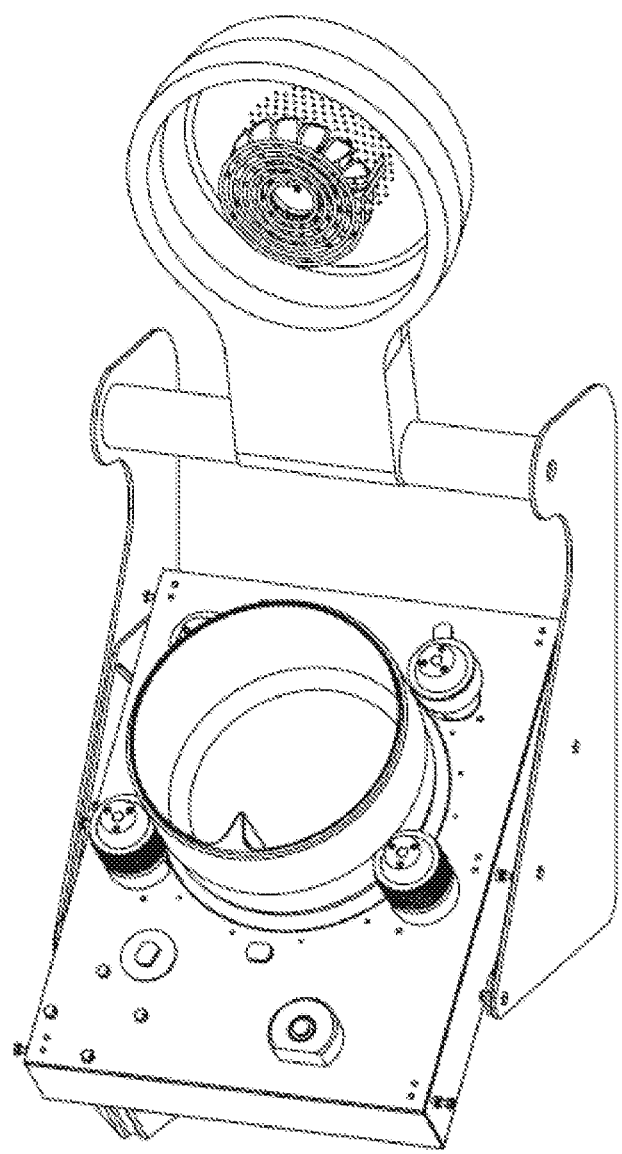
FIG. 4 is an isometric view of the air fryer cooking apparatus of the present invention.
Figure 5:
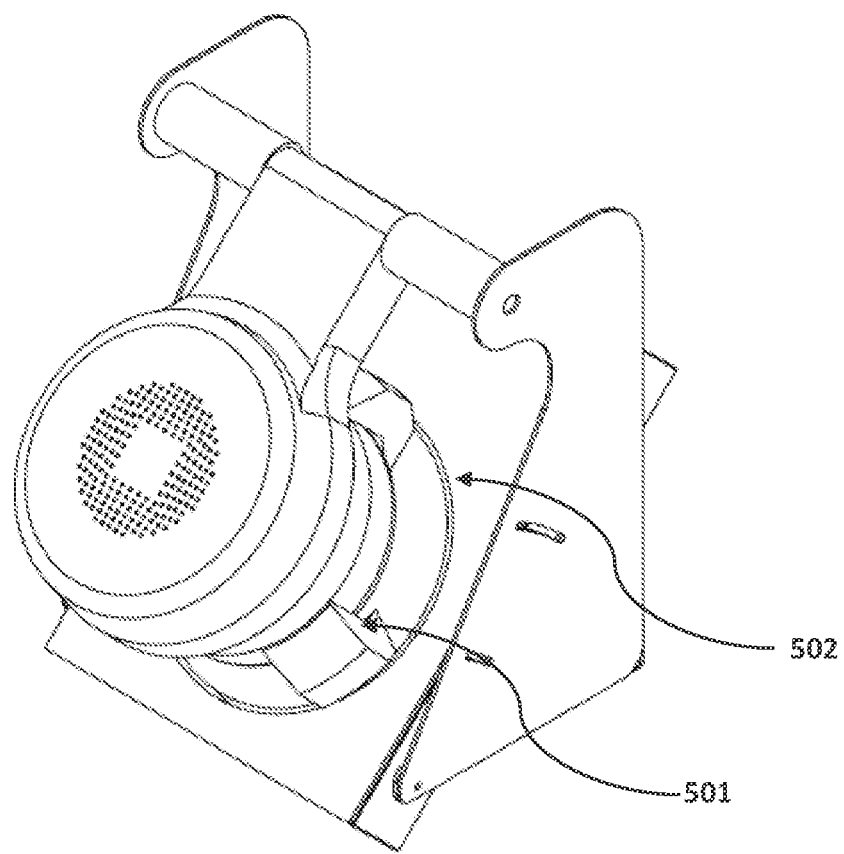
FIG. 5 is an isometric view of the apparatus incorporating a vibration mechanism.
Figure 6:
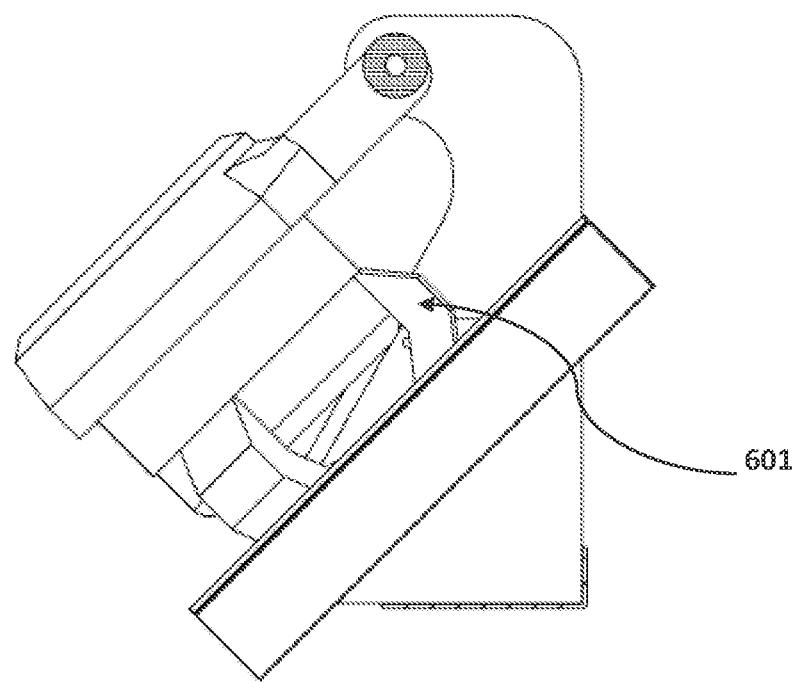
FIG. 6 is a cross section view of the apparatus incorporating a vibration mechanism.

Referring to FIGS. 4 and 5, in some embodiments of the present invention, the cooking vessel or the cooking pot is equipped to vibrate during the cooking regime, thereby generating a relative motion of the food ingredients within the vessel or the pot, relative to its inner surface. The vibration, further, generates a stirring motion, disturbing the food ingredients and creating a relative motion between the ingredients.

The vibration motion and the vibration forces may be generated and applied on the removable cooking vessel or the removable cooking pot by an apparatus such as but not limited to, pneumatic drive or pneumatic element, AC or DC electrical motor or electrical rotational drive incorporating and eccentric element, electromagnetic actuator or electrical linear motor, solenoid valve.

Further, it is to be noted that the cooking vessel or a cooking pot can, which can be removed or replaced or repositioned, and which is to be gripped to the vibration mechanism 502 or a vibration element involves equipping the present apparatus with a mechanism such as but not limited to, a mechanical gripping clamp or a mechanical gripping mechanism 501, electromagnet, permanent magnet, pneumatic suction element. The contact point of the gripping mechanism 501 with the cooking vessel or the cooking pot may be insulated to temperatures of 100° F. or 300° F. or 450° F. or 600° F. which might be achieved by incorporating a layer of materials such as but not limited to, silicone, Viton, ceramics—such as alumina or zirconia, cork, between the cooking vessel or the cooking pot heated surface and the gripping mechanism.

The vibration motion characteristics, such as but not limited to, vibration motion frequency and the vibration motion amplitude might be controlled, adjusted and altered as a function of system parameters, such as but not limited to, system size, cooking vessel or cooking pot size and geometry, cooking vessel or cooking pot weight, amount and weight of the food ingredients, cooking duration and temperature, recipe and cooking regime.

In the present apparatus, a vibration profile can be set. The vibration profile may be defined as the change in vibration motion characteristics, such as but not limited to, vibration motion frequency and vibration motion amplitude vs. the cooking or operating cycle duration or cooking time or system operating time.

The vibration motion amplitude and frequency might be preset, adjusted before or during the cooking cycle, turned on and off during the cooking cycle or altered during the cooking cycle. The vibration motion frequency and amplitude might be controlled, turned on and off, altered or adjusted depending on the cooking modes. For example, a specific recipe, requiring a predefined, specific air temperature regime, which alters during the cooking cycle, might require a specific vibration motion frequency profile, altering the vibration motion frequency vs. the air temperature fluctuation. The vibration frequencies might be, but not limited to 1 Hz or 10 Hz or 100 Hz or 1000 Hz. The vibration amplitudes might be, but not limited to 0.1 mm or 1 mm or 10 mm or 20 mm. For example, a pasta recipe might require low frequency and high amplitude vibration motion, such as 5 Hz frequency and 10 mm amplitudes, while a salad recipe might not require any vibration motion at all, turning the vibration off. Another example would be a French fries recipe, which would require a 10 Hz frequency and 2 mm amplitude, for example, for the first 30% of the cooking cycle duration and 10 Hz frequency and 5 mm amplitude of the vibration motion during the rest 70% of the cooking cycle. Another example would be a salad recipe, which requires stirring motion without heating. In this example the vibration movement will be generated without or regardless the air fryer operation.

The vibration generating element or the vibration generating mechanism is invoked by the controller which receives commands from a system PC or robotic or automated system PC or a system cloud server. The controller receives feedback from the vibration generating element or a vibration generating drive or a vibration generating mechanism regarding the recipe requirement. The controller sets the vibration movement parameters, such as but not limited to, vibration frequency, vibration amplitude, vibration duration according to the received inputs of the recipe requirement. The controller also, invokes the cooking vessel or the cooking pot gripping mechanism, gripping or releasing the pot when positioned in place, removed or adjusted depending upon the requirements of the recipe and the settings of the cooking modes.

In some embodiments of the present invention, the apparatus is provided with a removable cooking pot which is enabled by the pivoted air fryer mechanism which provides full access to manually or automatically place and remove the cooking pot from the apparatus. The cooking pot might include a gripping interface, such as but not limited to, a steel ring for gripping by electromagnets. Using various motion systems, such as but not limited to, driven linear guides, robotics arms, pneumatic actuators or electric actuators, the cooking pot can be gripped and removed from the apparatus and replaced by a clean cooking pot. Placing and removing the cooking pot from the apparatus is done by a single line of movement.

In some embodiments of the present invention the cookware can be mounted on the apparatus both manually and automatically which is achieved by the presence of spring-loaded idler wheels which are flexible and increases the placement tolerance requirement thereby enabling both manual and automatic cookware mounting. The spring-loaded idler wheels enables simple mounting and dismounting of the cookware, either manually or automatically, by a single line of movement. Since, spring loaded idler wheels tolerate a predefined amount of positioning error, thereby easing the manual mounting operation or motion precision requirements from the peripheral subsystems.

The cookware may be mounted by a single directional linear motion, generated manually by hand or automatically by a motion mechanism such motion mechanism might be a motor driven linear motion guide, gripping the cookware, or a pneumatic drive, or a pneumatic piston, or a linear motor, or any other component generating a linear motion. The above-described-mechanism is capable of positioning the cookware precisely and perpendicularly to the induction ceramic glass and performs a linear motion, while maintaining a real time position control. The mechanism positions the cookware in a predefined position.

In some embodiments the cooking pot is provided with an integral stirrer for disturbing the food products within the cooking pot cavity. The pot's inner surface geometry includes a protrusion which acts as a stirrer during the rotational movement, thereby generating a stirring motion. The protrusion geometry can vary, depending on constrains such as but not limited to, the scale of the apparatus, the recipe the surrounding robotic system requirements and limitations. The stirrer protrudes inwards 5 mm e.g., 10 mm e.g., 40 mm e.g., 60 mm. The protrusion cross-section might be trapezoidal, triangular or rectangular.

In some embodiments, the cooking apparatus of the present invention provides for an adjustable cooking plane angle. The cooking plane can be inclined for cooking optimization, and controlling the stirring motion of the cooked food ingredients. The incline is achieved by mounting the apparatus on a static base, having a rotational pivot. The inclined angle might be limited, thus predefining the incline angle range. The incline angle can be preadjusted or changed manually, or preadjusted and controlled by a drive, such as but not limited to, electrical motor drive, pneumatic drive, electric actuator.

The present invention provides controlled cooking regimes for various recipes and food product requirements. The apparatus of the present invention optimizes the controlled parameters, for a specific recipe which includes but is not limited to, air temperature, air stream duration and frequency, pot's rotational velocity and direction which may be optimized for a specific recipe. Optimization of the above parameters might result in reduction in the meal preparation duration, meal consistency and flavor.

In some embodiments of the present invention, the apparatus allows cookware of varying texture and surface finishes to be used for cooking since the texture and the surface finish of the cookware have little effect on the tangential friction forces generated by the friction wheels as the spring-loaded idler wheels applies normal forces on the cookware's outer diameter which increases the range of cookware that can be used on the apparatus.

In some embodiments, the apparatus can be operated stand alone as in prior art or it can also be operated as a subsystem of an automated food preparation apparatus. A series of independent cooking units can be operated and controlled by a processor, adjusting the rotational speed and direction, as well as the power, and other parameters individually. Further, the inclined cooking angle can also be individually adjusted as well, manually or automatically, to match the requirements for variety of recipes cooked.

The present disclosed subject matter may be a system, a method, and/or a computer program product. The computer program product may include a computer readable storage medium (or media) having computer readable program instructions thereon for causing a processor to carry out aspects of the present disclosed subject matter. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter. Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The invention claimed is:

1. An air fryer cooking apparatus for robotic and automatic food preparation systems, comprising:
    an air fryer hood; and
    a rotating cooking pot mounted within the air fryer and having a rotational mechanism driving motor configured to rotate the rotating cooking pot,
    wherein a heating element subunit is positioned in the air fryer hood for heating a high velocity air stream, the high velocity air stream generated by a fan subunit having a fan motor,
    the fan subunit configured to operate the fan motor to create a vortex of an air flow regime, forcing the air from the environment through the heating element and evenly distributing the air within the rotating cooking pot;
    wherein,
    an inner surface geometry of the rotating cooking pot includes a protrusion configured to act as an integral stirrer during rotation of the rotating cooking pot;
    wherein the heating element subunit and the fan subunit are independently controlled; and
    wherein a gripping interface of the cooking pot is a steel ring configured to be gripped by electromagnets.

2. The air fryer of claim 1, wherein the rotating cooking pot is equipped with a vibrating mechanism.

3. The air fryer cooking apparatus of claim 1, wherein the heating element is an open coil of resistance wire type, the heating element being configured to be thermostatically regulated to maintain cooking temperatures ranging from 150 to 450 degrees F.

4. The air fryer cooking apparatus of claim 1, wherein the fan motor has an adjustable speed control configured to regulate, an air velocity ranging between 1000 feet per minute to 2600 feet per minute, depending upon the recipe.

5. The air fryer cooking apparatus of claim 1, wherein the air fryer hood pivoted to full disengagement of the air fryer hood to access the rotating cooking pot and the air fryer hood separately.

6. The air fryer cooking apparatus of claim 5, wherein the pivoted hood is configured to be operated in a rotational motion, the rotational motion generated by an electrical motor or pneumatic actuator.

7. The air fryer of claim 1, wherein the rotating cooking pot is mounted both manually and automatically.

8. The air fryer of claim 1, wherein an adjustable cooking plane angle is configured to be adjusted manually and automatically and is further configured to control a cooking optimization and a stirring motion of cooked food ingredients.

9. The apparatus of claim 1, wherein the rotating cooking pot is equipped with adjustable motor speed control, configured for rotational velocity adjustment and direction regulation per recipe.

* * * * *